US010126730B2

(12) United States Patent
Gourraud et al.

(10) Patent No.: US 10,126,730 B2
(45) Date of Patent: Nov. 13, 2018

(54) METHOD FOR MACHINING A SURFACE OF AN OPTICAL LENS

(71) Applicant: Essilor International (Compagnie Générale d'Optique), Charenton-le-Pont (FR)

(72) Inventors: Alexandre Gourraud, Charenton-le-Pont (FR); Loïc Quere, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 663 days.

(21) Appl. No.: 14/439,158

(22) PCT Filed: Oct. 28, 2013

(86) PCT No.: PCT/EP2013/072535
§ 371 (c)(1),
(2) Date: Apr. 28, 2015

(87) PCT Pub. No.: WO2014/067909
PCT Pub. Date: May 8, 2014

(65) Prior Publication Data
US 2015/0277422 A1    Oct. 1, 2015

(30) Foreign Application Priority Data

Oct. 29, 2012  (EP) .................................. 12306349

(51) Int. Cl.
*B23C 3/00* (2006.01)
*G05B 19/402* (2006.01)
(Continued)

(52) U.S. Cl.
CPC .............. *G05B 19/402* (2013.01); *B23B 5/00* (2013.01); *B24B 13/06* (2013.01); *B24B 47/22* (2013.01);
(Continued)

(58) Field of Classification Search
CPC .. G05B 19/402; G05B 19/401; G05B 19/403; B23C 2220/00; B24B 13/06; B24B 47/22; B28D 1/16; B23B 2226/45
See application file for complete search history.

(56) References Cited

U.S. PATENT DOCUMENTS 4,956,944 A      9/1990  Manabu et al.
4,969,783 A  *  11/1990  Ozawa ................... B24B 13/00
                                                        409/132
(Continued)

FOREIGN PATENT DOCUMENTS

EP       2184132       5/2010

OTHER PUBLICATIONS

International Preliminary Report on Patentability and Written Opinion of the International Searching Authority for International Application No. PCT/EP2013/072535, dated May 5, 2015 (6 pages).

(Continued)

*Primary Examiner* — Will Fridie, Jr.
(74) *Attorney, Agent, or Firm* — Young & Thompson

(57) ABSTRACT

Methods of determining movement data representing the movement of a machining tool of an optical lens lathing device for machining one or more optical surfaces or parts thereof of a set of optical surfaces are described. The methods comprise a greatest radial slope amplitude determining step during which the greatest radial slope amplitude of the optical surfaces of the set of optical surfaces is determined. The methods also comprise a machining tool selecting step during which a machining tool having a window angle greater than or equal to the greatest radial slope amplitude of the optical surfaces of the set of surfaces to be manufactured is selected. The methods further comprise a movement data determining step during which movement data representing the movement of the selected (Continued)

machining tool are determined and synchronized with the angular position of the optical surface driven in rotation.

16 Claims, 5 Drawing Sheets

(51) Int. Cl.
    *B24B 13/06*     (2006.01)
    *B24B 47/22*     (2006.01)
    *B23B 5/00*     (2006.01)
    *B28D 1/16*     (2006.01)

(52) U.S. Cl.
    CPC ............ *B28D 1/16* (2013.01); *B23B 2226/61* (2013.01); *G05B 2219/39403* (2013.01); *G05B 2219/50289* (2013.01); *Y10T 82/10* (2015.01)

(56) References Cited

U.S. PATENT DOCUMENTS

| | | | |
|---|---|---|---|
| 6,382,790 B1 | 5/2002 | Denis | |
| 2003/0043343 A1* | 3/2003 | Diehl | B23C 3/023 351/159.75 |
| 2004/0178528 A1* | 9/2004 | Diehl | B23B 1/00 264/2.7 |
| 2010/0288089 A1* | 11/2010 | Miyamoto | B23B 5/08 82/118 |
| 2011/0307212 A1* | 12/2011 | Nishikawa | G01B 21/042 702/152 |
| 2013/0236262 A1* | 9/2013 | Hon | B23Q 15/225 409/132 |
| 2014/0039665 A1* | 2/2014 | Schneider | G05B 13/024 700/159 |
| 2015/0128773 A1* | 5/2015 | Schneider | B24B 13/00 82/1.11 |
| 2016/0311184 A1* | 10/2016 | Gourraud | B29D 11/00432 |
| 2017/0168317 A1* | 6/2017 | Mandler | G02C 7/022 |

OTHER PUBLICATIONS

Extended European Search Report and European Written Opinion for European Application No. 12306349.7, dated May 8, 2013 (4 pages).

* cited by examiner

METHOD FOR MACHINING A SURFACE OF AN OPTICAL LENS

CROSS REFERENCE TO RELATED APPLICATIONS

This application is a U.S. national stage application of International Application No. PCT/EP2013/072535 filed Oct. 28, 2013, which claims the benefit of priority to EP Application No. 12306349.7, filed Oct. 29, 2012; the entirety of each of said applications is incorporated herein by reference.

FIELD OF THE INVENTION

The invention described herein relates to a method of determining movement data representing the movement of a machining tool of an optical lens lathing device for machining optical surfaces part of a set of optical surfaces and to a method for machining an optical surface.

BACKGROUND

Some processes of preparing optical or ophthalmic lenses start with the selection of an unfinished or semi-finished glass or plastic lens blank. Typically, a semi-finished lens blank has a finished surface and an unfinished surface.

At least one of the surfaces of the lens blank has to be adapted so as to generate the required corrective prescription.

By machining the unfinished surface of the lens blank, the required corrective prescription can be generated.

Thereafter, the surface having been machined is polished and the peripheral edge of the thus processed lens blank is provided with a final desired contour thereby establishing a finished optical or ophthalmic lens. According to other processing methods, the finished ophthalmic lens can be directly processed from a lens blank by machining both surfaces of the optical lens blank. The lens blank can be a plastic lens blank.

Reducing the time required for the machining step reduces the overall cost of the manufacturing process.

One solution for reducing the machining time consists of increasing the infeed of the machining tool during the machining process.

One of the limits of the increase of the infeed of the machining tool is the quality of the produced surface. However, the greater the radius of the machining tool, the greater the infeed of the machining tool can be increased without degrading the quality of the machined surface.

Machining tools have synthetic monocrystal diamond tips and therefore, increasing the radius of such a diamond tip, increases the volume of synthetic monocrystal diamond to the power of 2 to 3. Thus, increasing the radius of the diamond tip increases the cost of the machining tool and the machining process.

The discussion of the background herein is included to explain the context of the invention. This is not to be taken as an admission that any of the material referred to was published, known or part of the common general knowledge at the priority date of any of the claims.

SUMMARY

One object described herein is to provide a method of machining an ophthalmic surface that does not present the drawbacks mentioned hereinabove.

To this end, disclosed herein is a method of determining movement data representing the movement of a machining tool of an optical lens lathing device for machining optical surfaces part of a set of optical surfaces, wherein:

the set of optical surfaces comprises at least one non rotationally symmetrical surface, the optical lens lathing device comprises a movement axis allowing relative movements between a tool and the optical surface according to:

a first rotation axis, a parallel translation axis substantially parallel to the first rotation axis, a perpendicular translation axis substantially perpendicular to the first rotation axis, and a second rotation axis substantially perpendicular to the plan comprising the parallel and perpendicular translation axis, the optical lens lathing device being configured to drive in rotation an optical surface to be manufactured about the first rotation axis and to drive the machining tool relative to the optical surface in translation along the parallel and perpendicular translation axis and in rotation about the second rotation axis, and wherein the method comprises:

a greatest radial slope amplitude determining step during which the greatest radial slope amplitude of the optical surfaces of the set of optical surfaces is determined, a machining tool selecting step during which a machining tool having a window angle greater than or equal to the greatest radial slope amplitude of the optical surfaces of the set of surfaces to be manufactured is selected, a movement data determining step during which movement data representing the movement of the selected machining tool along the perpendicular and parallel translation axis and about the second rotation axis so as to machine the surface of the optical lens are determined and synchronized with the angular position of the optical surface driven in rotation about the first rotation axis.

Advantageously, the method described herein allows for selection of a machining tool having a smaller window angle than found in the prior art methods. Thus, for a given radius of the machining tool the overall volume of the machining tool may be reduced compared to the prior art methods, reducing the overall cost of the manufacturing process.

According to further embodiments, which may be considered alone or in combination:

during the movement data determining step, the movement data about the second rotation axis are determined so that during the machining of the optical surface the contact point of the machining tool changes within the window angle of the machining tool; and/or the method further comprises:

a decomposition step during which the optical surface of the set of optical surfaces to be machined is decomposed in a rotationally symmetrical component and a non-rotationally symmetrical component, wherein the greatest radial slope in absolute value of the non-rotationally symmetrical component is smaller than or equal to the greatest radial slope amplitude of the optical surfaces of the set of surfaces to be manufactured, and during the movement data determining step, the rotation about the second rotation axis is determined so that along the surface to be machined, the angle between the axis of the machining tool and the normal at the rotationally symmetrical component of the optical surface is substantially constant; and/or during the decomposition step, the rotationally symmetrical component and the non-rotationally symmetrical component are determined so as to minimize the amplitude of the translation movement of the machining tool along the parallel axis; and/or during the greatest radial slope amplitude determining step, the greatest radial slope amplitude is determined by determining the radial slope amplitude of each optical surface of the set of optical surfaces and by selecting the greatest radial slope amplitude of the optical surfaces of the set of optical surfaces, the radial slope amplitude of each optical surface being determined along the circumscribed circle of the outer edge of each optical surface; and/or during the machining tool selecting step the machining tool has a window angle smaller than or equal to GRSA+10°, with GRSA being the greatest radial slope amplitude of the optical surfaces of the set of surfaces to be manufactured; and/or the optical lens lathing device is configured so that the frequency of reversal of the translation movement of the machining tool along the parallel axis may be greater than or equal to the rotation frequency of the optical surface about the first rotation axis; and/or the optical lens lathing device is configured so that the frequency of reversal of translation of the machining tool along the perpendicular axis may be smaller than or equal to the rotation frequency of the optical surface about the first rotation axis; and/or the optical lens lathing device is configured so that the frequency of reversal of rotation of the machining tool about the second rotation axis may be smaller than or equal to the rotation frequency of the optical surface about the first rotation axis; and/or during the machining tool selecting step, for a given machining tool width, the machining tool having the smallest window angle so as to have the greatest radius is selected.

According to another aspect, described herein is a method for machining an optical surface, the method comprises:

a lathe device providing step in which an optical lens lathe device comprising:

a first rotation axis, a parallel translation axis substantially parallel to the first rotation axis, a perpendicular translation axis substantially perpendicular to the first rotation axis, and a second rotation axis substantially perpendicular to the plan comprising the parallel and perpendicular translation axis is provided, the optical lens lathe device being configured to drive in rotation the optical surface to be manufactured about the first rotation axis and to drive the machining tool in translation along the parallel and perpendicular translation axis and in rotation about the second rotation axis, and a machining step during which the optical surface is machined by driving in rotation about the first rotation axis the optical surface and having a machining tool of the optical lens lathe device move according to movement data determined using a method described herein, the machining tool being the one selected during the machining tool selecting step.

According to further embodiments, which may be considered alone or in combination:

the frequency of reversal of the translation movement of the machining tool along the parallel axis is greater than or equal to the rotation frequency of the optical surface about the first rotation axis;

the frequency of reversal of translation of the machining tool along the perpendicular axis is smaller than or equal to the rotation frequency of the optical surface about the first rotation axis;

the rotation frequency of the machining tool about the second rotation axis is smaller than or equal to the rotation frequency of the optical surface about the first rotation axis.

According to a further aspect, described herein is a computer program product comprising one or more stored sequence of instruction that is accessible to a processor and which, when executed by the processor, causes the processor to carry out the steps of the methods described herein.

According to another aspect described herein is a program which makes a computer execute the method described herein.

A computer readable medium carrying out one or more sequences of instructions of the computer program described herein is also described.

Further described is a computer-readable storage medium having a program recorded thereon, where the program makes the computer execute the method described herein.

Still further is a device comprising a processor adapted to store one or more sequence of instructions and to carry out at least one of the steps of a method described herein.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments described herein may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments presented herein are not described with reference to any particular programming language. It will be appreciated that a variety of programming languages may be used to implement the teachings as described herein.

BRIEF DESCRIPTION OF THE DRAWINGS

Non limiting embodiments will now be described with reference to the accompanying drawing, wherein.

DESCRIPTION

Elements in the figures are illustrated for simplicity and clarity and have not necessarily been drawn to scale. For example, the dimensions of some of the elements in the figure may be exaggerated relative to other elements to help improve the understanding of the embodiments described herein.

Figure 1:
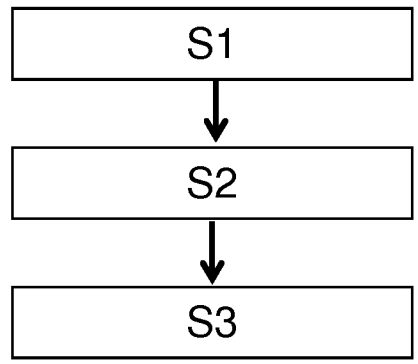
FIG. 1 is a flowchart of a method as described herein.

According to an embodiment as illustrated in FIG. 1, the method of determining movement data representing the movement of a machining tool of an optical lens lathing device for machining optical surfaces part of a set of optical surfaces comprises:

a greatest radial slope amplitude determining step S1,
a machining tool selecting step S2, and
a movement data determining step S3.

According to embodiments described herein, the set of optical surfaces comprises at least one non-rotationally symmetrical surface.

The optical surfaces of the set of optical surfaces may be any one or more of front or back surfaces of the optical lens, and concave or convex surfaces.

Typically, the set of optical surfaces may correspond to the set of optical surface to be manufactured over a given period a time in a lab, for example in the next 24 hours.

Figure 2A:
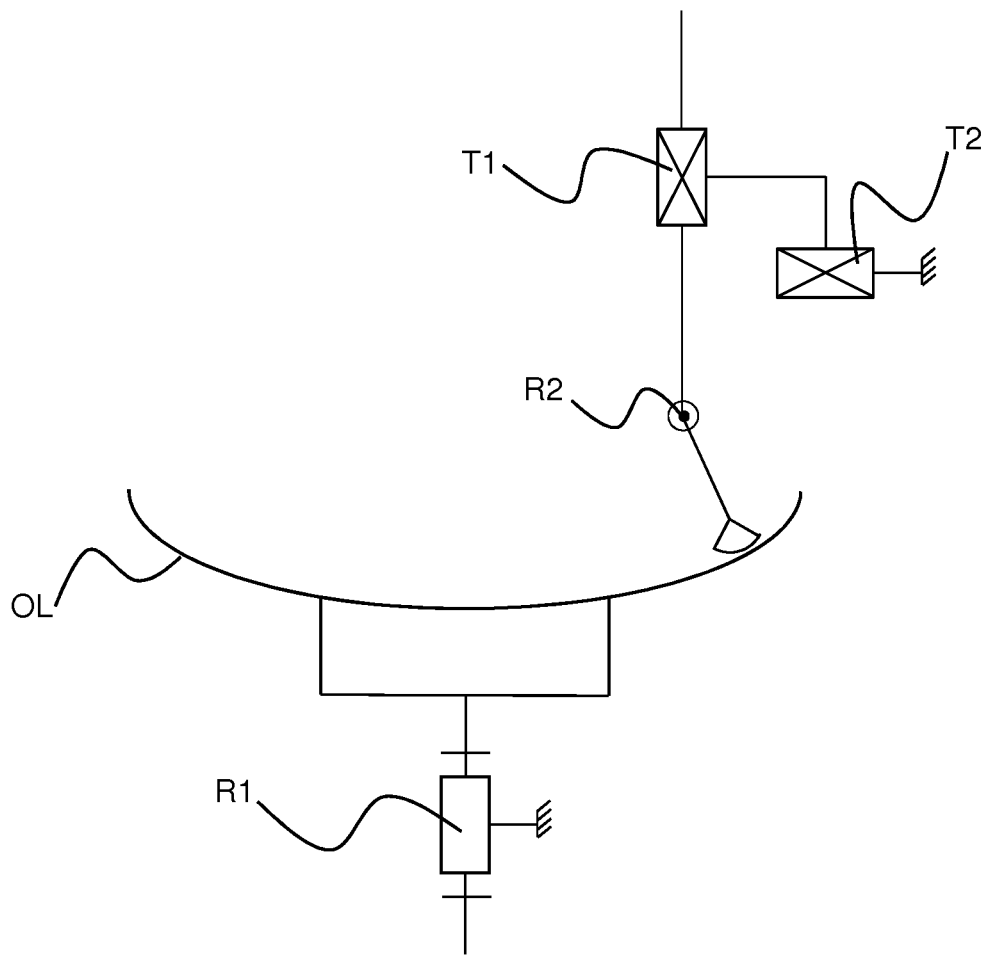
FIGS. 2a and 2b represent optical lens lathing devices that may be used to machine an optical lens as described herein.
Figure 2B:
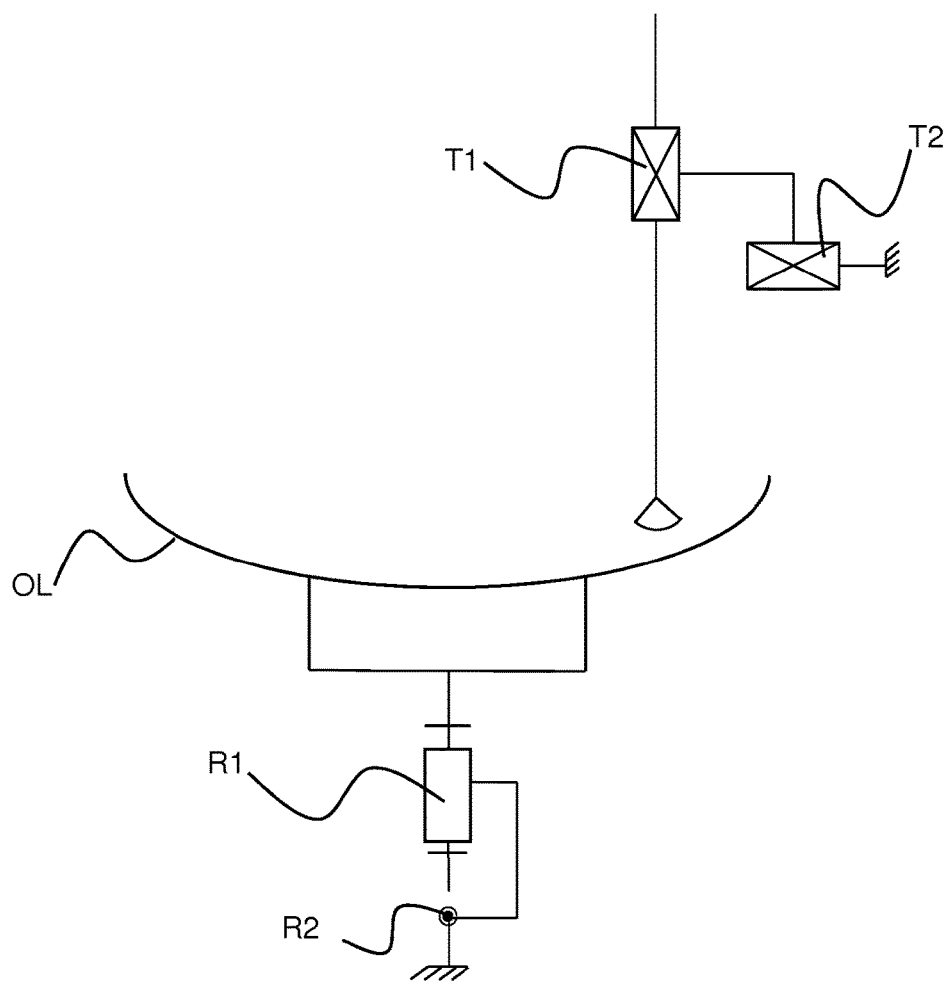

Examples of optical lens lathing devices that may be used to machine the optical surface according to the movement data determined using the method described herein are represented in FIGS. 2a and 2b.

As illustrated in FIGS. 2a and 2b, the optical lens lathing device comprises at least four movement axes comprising:

a first rotation axis R1 arranged to drive in rotation the optical lens to be machined,
a parallel translation axis T1 substantially parallel to the first rotation axis R1 arranged to drive in translation the machining tool in a direction parallel to the first rotation axis R1,
a perpendicular translation axis T2 substantially perpendicular to the first rotation axis R1, arranged to drive in translation the machining tool in a direction perpendicular to the first rotation axis R1, and
a second rotation axis R2 substantially perpendicular to the plan comprising the parallel T1 and perpendicular T2 translation axis.

The optical lens lathing device is configured to drive the machining tool relative to the optical surface in translation along the parallel and perpendicular translation axis and in rotation about the second rotation axis.

According to an embodiment represented in FIG. 2a the second rotation axis R2 is on the machining tool side, whereas according to an embodiment represented with FIG. 2b the second rotation axis R2 is on the optical surface side.

The first rotation axis R1 may be in the plan defined by the parallel translation axis T1 and the perpendicular translation axis T2.

According to an embodiment, the optical lens lathing device is configured so that the frequency of reversal of the translation movement of the machining tool along the parallel axis may be greater than or equal to the rotation frequency of the optical surface about the first rotation axis.

The optical lens lathing device may be configured so that the frequency of reversal of translation of the machining tool along the perpendicular axis may be smaller than or equal to the rotation frequency of the optical surface about the first rotation axis.

According to an embodiment, the optical lens lathing device is configured so that the rotation frequency of the machining tool about the second rotation axis is smaller than or equal to the rotation frequency of the optical surface about the first rotation axis.

During the greatest radial slope determining step S1, the greatest radial slope amplitude of the optical surfaces of the set of optical surfaces is determined.

Figure 3A:
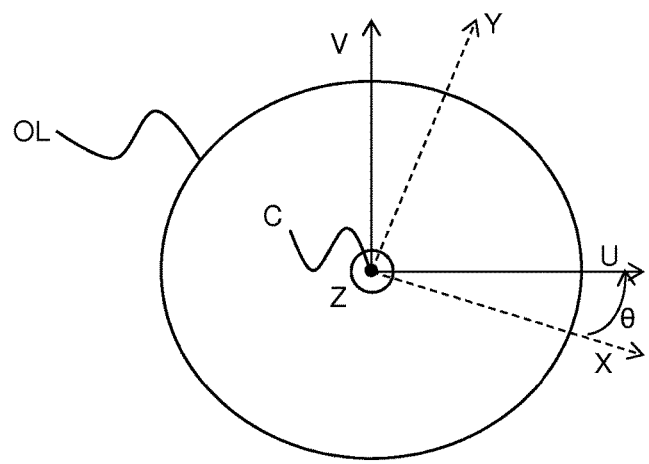
FIG. 3a represents an optical lens surface with the surface frame reference.
Figure 3B:
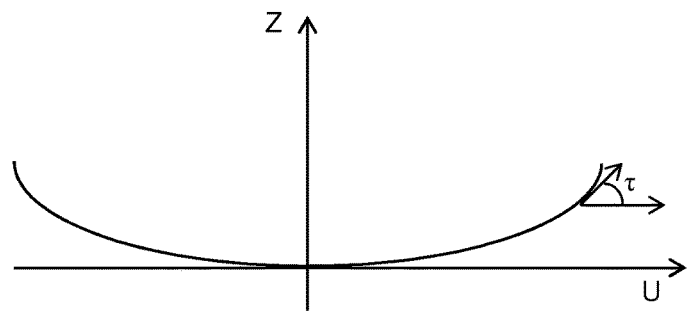
FIG. 3b represents a radial profile of a manufactured surface of an optical lens.

The radial slope is defined with reference to FIGS. 3a and 3b.

As represented with FIG. 3a, an optical surface is associated with a surface frame of reference (X,Y,Z) centered on the reference point C of the surface. One can define the rotational frame of reference (U,V,Z) centered on the reference point C of the surface frame of reference and defined as having an angle θ between the X and U axes.

As represented with FIG. 3b, for a given value of the angle θ, the radial profile corresponds to the section of the surface in the plan (C,U,Z). For each point of the radial profile, the radial slope is the angle τ between the tangent of the radial profile and the axis U.

For a given value of the coordinate along the U axis with the angle θ from 0° to 360° one can determine the amplitude of radial slope as being the absolute value of the difference between the greatest and smallest radial slope when the angle θ varies from 0° to 360°.

The greatest amplitude of radial slope for a surface can be determined by determining the amplitudes radial slopes along the U axis.

As described herein, during the greatest radial slope determining step, the greatest radial slope amplitude of each optical surface of the set of optical surfaces is determined so as to determine the greatest radial slope over the set of optical surfaces.

As described herein, in an embodiment, the greatest radial slope amplitude may be determined by determining the radial slope amplitude of each optical surface of the set of optical surfaces and by selecting the greatest radial slope amplitude of the optical surfaces of the set of optical surfaces, the radial slope amplitude of each optical surface being determined along the circumscribed circle of the outer edge of each optical surface. As described herein, in an embodiment, the center of the circumscribed circle corresponds to the center of rotation of the surface, i.e., the point of the surface that belongs to the first rotation axis R1 when the surface is being rotated. Thus, the center of the circumscribed circle may be different based on the position of the surface when being rotated about the first rotation axis R1.

During the machining tool selecting step, a machining tool is selected. The machining tool is selected so as to have a window angle α greater than or equal to the greatest radial slope amplitude of the optical surfaces of the set of surfaces to be manufactured.

Figure 4:
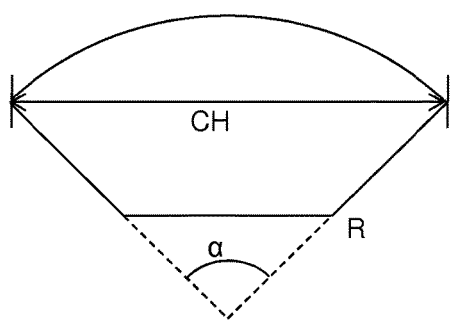
FIG. 4 illustrates a top view of a machining tool used to machine an optical surface as described herein.

As illustrated in FIG. 4, the chord CH of the machining tool is linked to the window angle α of the machining tool.

Since, the price of the machining tool is linked to the chord CH, it is interesting to select a machining tool having the smallest window angle as possible.

Therefore, according to an embodiment, the machining tool selected has a window angle α greater than or equal to GRSA and smaller than or equal to GRSA+10°, for example smaller than or equal to GRSA+5°, with GRSA being the greatest radial slope amplitude of the optical surfaces of the set of surfaces to be manufactured.

As described herein, in an embodiment, so as to have the greatest radius during the machining tool selecting step for a given machining tool chord CH, the machining tool having the smallest window angle is selected. In other words, for a given price, the machining tool having the greatest radius and allowing manufacturing the set of surfaces can be selected.

During the movement determining step S3, movement data representing the movement of the selected machining tool along the perpendicular and parallel translation axes and about the second rotation axis so as to machine the surface of the optical lens are determined. The movements of the machining tool along the perpendicular, parallel and second rotation axes are synchronized with the angular position of the optical surface driven in rotation about the first rotation axis.

As described herein, in an embodiment, the movement data, in particular, the movement data about the second rotation axis, are determined so that, during the machining of the optical surface, the contact point of the machining tool changes within the window angle of the machining tool.

In the sense of what is described herein, the contact point of the machining tool is the point of the machining tool that is tangent to the machined surface.

Advantageously, having the contact point change, allows there to be a frequency of reversal of rotation about the second rotation axis smaller than or equal to the rotation frequency of the optical surface. Thus, the machining process is easier to implement.

Figure 5:
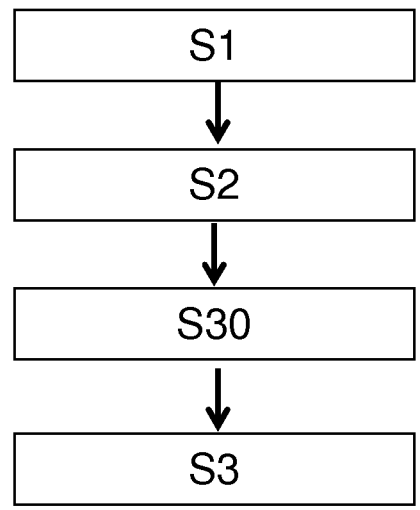
FIG. 5 is a flowchart of the set of a method as described herein.

As illustrated in FIG. 5, according to an embodiment, the method may comprise, prior to the movement data determining step S3, a decomposition step S30.

During the decomposition step S30, each optical surface of the set of optical surfaces is decomposed in a rotationally symmetrical component and a non-rotationally symmetrical component.

Such decomposition may be carried out by any method known to the person skilled in the art. Preferably, the decomposition of each surface is done so that the greatest radial slope in absolute value of the non-rotationally symmetrical component of the surface is smaller than or equal to the greatest radial slope amplitude of the optical surfaces of the set of surfaces to be manufactured.

According to such an embodiment, during the movement data determining step, the rotation movement about the second rotation axis is determined so that along the surface to be manufactured, the angle between the axis of the machining tool and the normal at the rotationally symmetrical component of the optical surface is substantially constant.

In other words, according to such an embodiment, the movement data about the second rotation axis are determined according to the rotationally symmetrical component of each optical surface to be machined. Thus, the movement data about the second rotation axis are simplified and so is the lathing device.

Furthermore, during the decomposition step S30, the rotationally symmetrical component and the non-rotationally symmetrical component may be determined so as to minimize the amplitude of the translation movement and the successive temporal derivative of the translation movement, i.e., speed, acceleration, as examples, of the machining tool along the parallel axis.

Advantageously, such an embodiment allows using a lathing device having a frequency of reversal of translation, respectively rotation, of the machining tool along the perpendicular axis, respectively about the second rotation axis, smaller than or equal to the rotation frequency of the optical surface about the first rotation axis.

Advantageously, such an embodiment allows either at equal performance reducing the dimension of the engine of the machining device or at equal dimension of the engine increasing the frequency leading to a shorter machining time and thus greater productivity.

Figure 6:
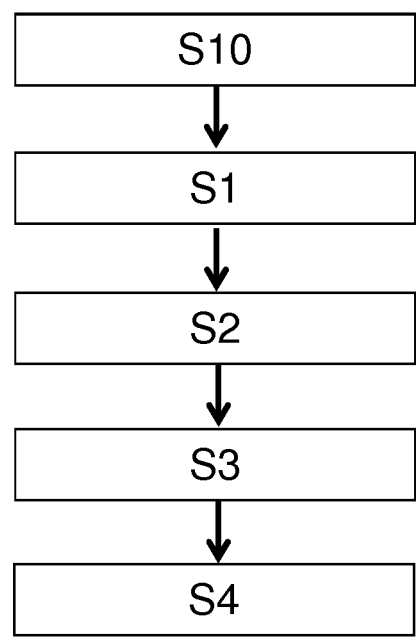
FIG. 6 is a flowchart of the set of a machining method as described herein.

As illustrated in FIG. 6, further described herein is a method for machining a set of optical surfaces, in which the method may comprise:
  a lathing device providing step S10,
  a greatest radial slope amplitude determining step S1,
  a machining tool selecting step S2,
  a movement data determining step S3, and
  a machining step S4.

During the lathing device providing step S10, an optical lens lathing device as described previously and, for example, as illustrated in FIG. 2a or 2b, is provided.

The greatest radial slope amplitude determining step S1, the machining tool selecting step S2 and the movement data determining step S3 are as described previously. In particular, the method may comprise, prior to the movement data determining step S3, a decomposition step S30 as described previously.

During the machining step S4, the optical surface is machined by driving the optical surface in rotation about the first rotation axis and by having a machining tool of the optical lens lathing device move according to movement data determined during the movement data determining step S3.

The invention has been described above with the aid of embodiments without limitation of the general inventive concept.

The invention claimed is:

1. A method of determining movement data representing movement of a machining tool of an optical lens lathing device for machining an optical surface of a set of optical surfaces,
  the set of optical surfaces comprising at least one non rotationally symmetrical surface,
  the optical lens lathing device comprising a movement axis allowing relative movements between the machining tool and the optical surface, the movement axis comprising at least four movement axes comprising:
  a first rotation axis,
  a parallel translation axis substantially parallel to the first rotation axis, a perpendicular translation axis substantially perpendicular to the first rotation axis, and a second rotation axis substantially perpendicular to a plan comprising the parallel translation axis and the perpendicular translation axis, the optical lens lathing device being configured to drive in rotation the optical surface to be manufactured about the first rotation axis and to drive the machining tool relative to the optical surface along the parallel translation axis and the perpendicular translation axis and in rotation about the second rotation axis, the method comprising:

a greatest radial slope amplitude determining step during which a greatest radial slope amplitude of the optical surface of the set of optical surfaces is determined;

a machining tool selecting step during which the machining tool having a window angle greater than or equal to the greatest radial slope amplitude of the optical surface of the set of surfaces to be manufactured is selected; and a movement data determining step during which movement data representing movement of the selected machining tool along the perpendicular translation axis and the parallel translation axis and about the second rotation axis so as to machine the optical surface are determined and synchronized with an angular position of the optical surface driven in rotation about the first rotation axis.

2. The method according to claim 1, wherein during the movement data determining step, the movement data about the second rotation axis are determined so that during machining of the optical surface a contact point of the machining tool changes within the window angle of the machining tool.

3. The method according to claim 1, wherein the method further comprises:

a decomposition step during which the optical surface of the set of optical surfaces to be machined is decomposed in a rotationally symmetrical component and a non-rotationally symmetrical component, such that a greatest radial slope in absolute value of the non-rotationally symmetrical component is smaller than or equal to the greatest radial slope amplitude of the optical surface of the set of optical surfaces to be manufactured; and during the movement data determining step, rotation about the second rotation axis is determined so that along the optical surface to be machined, an angle between an axis of the machining tool and a normal at the rotationally symmetrical component of the optical surface is substantially constant.

4. The method according to claim 1, wherein during the greatest radial slope amplitude determining step, the greatest radial slope amplitude is determined by determining the radial slope amplitude of each optical surface of the set of optical surfaces and by selecting the greatest radial slope amplitude of the optical surface of the set of optical surfaces, the radial slope amplitude of each optical surface being determined along a circumscribed circle of an outer edge of each optical surface.

5. The method according to claim 1, wherein during the machining tool selecting step the window angle is smaller than or equal to the GRSA+10°, with the GRSA being the greatest radial slope amplitude of the optical surface of the set of surfaces to be manufactured.

6. The method according to claim 1, wherein the optical lens lathing device is configured so that a frequency of reversal of movement of the machining tool along the parallel translation axis is greater than or equal to a rotation frequency of the optical surface about the first rotation axis.

7. The method according to claim 1, wherein the optical lens lathing device is configured so that a frequency of reversal of the machining tool along the perpendicular translation axis is smaller than or equal to a rotation frequency of the optical surface about the first rotation axis.

8. The method according to claim 1, wherein a frequency of reversal of rotation of the machining tool about the second rotation axis is smaller than or equal to a rotation frequency of the optical surface about the first rotation axis.

9. The method according to claim 1, wherein during the machining tool selecting step, for a given machining tool width, the machining tool having a smallest window angle so as to have a greatest radius is selected.

10. A method for machining an optical surface, the method comprising:

a lathe device providing step in which is provided the optical lens lathe device comprising the movement axes comprising:

the first rotation axis;

the parallel translation axis substantially parallel to the first rotation axis;

the perpendicular translation axis substantially perpendicular to the first rotation axis; and the second rotation axis substantially perpendicular to the plan comprising the parallel translation axis and the perpendicular translation axis, the optical lens lathe device being configured to drive in rotation the optical surface to be manufactured about the first rotation axis and to drive the machining tool along the parallel translation axis and the perpendicular translation axis and in rotation about the second rotation axis; and a machining step during which the optical surface is machined by driving in rotation about the first rotation axis the optical surface and having the machining tool of the optical lens lathe device move according to movement data determined using the method of claim 1, the machining tool being selected during the machining tool selecting step.

11. The method according to claim 10, wherein a frequency of reversal of movement of the machining tool along the parallel translation axis is greater than or equal to a rotation frequency of the optical surface about the first rotation axis.

12. The method according to claim 10, wherein a frequency of reversal of translation of the machining tool along the perpendicular translation axis is smaller than or equal to a rotation frequency of the optical surface about the first rotation axis.

13. The method according to claim 10, wherein rotation frequency of the machining tool about the second rotation axis is smaller than or equal to rotation frequency of the optical surface about the first rotation axis.

14. A computer program product stored on computer memory and executed on a processor that when used on a computer apparatus causes the processor to carry out at least the steps of claim 1.

15. A non-transitory computer readable medium storing a computer program that when executed by a processor on a computer apparatus causes the processor to carry out one or more sequences of instructions of the computer program product of claim 14.

16. The method of claim 1, wherein the optical surface is any one or more of a front surface, a back surface, a concave surface, and a convex surface.

\* \* \* \* \*